United States Patent Office 3,207,746
Patented Sept. 21, 1965

3,207,746
METALLIZED DISAZO AND TRISAZO COMPOUNDS
Herbert Francis Andrew and Ronald Baker, Manchester, England, assignors to Imperial Chemical Industries Limited, Millbank, London, England, a corporation of Great Britain
No Drawing. Filed May 11, 1962, Ser. No. 194,173
Claims priority, application Great Britain, May 21, 1961, 19,080/61
4 Claims. (Cl. 260—146)

This invention relates to new azo compounds and more particularly to metal complex bisazo and polyazo compounds valuable for use as "reactive" dyes for the colouration of textile materials containing acylatable hydroxyl and/or amino groups, such as natural and regenerated cellulose, wool, silk, leather and polyamide fibres.

It has been proposed previously to use metal complex bisazo and polyazo dyes containing reactive groups (that is to say, a group by means of which the dye can react with the fibre to form a covalent bond) for the colouration of such textile materials; by this means, fabrics coloured in blue or tertiary shades can be obtained with much higher fastness to washing than can be obtained using direct dyes of the same shade. Hitherto, most dyes of this type which have been described have the disadvantage that in washing fabrics coloured with the dyes, the small amounts of dye removed stain adjacent white (or differently coloured) fabrics to an undesirably large degree. This effect has hitherto been considered to be an unavoidable consequence of the substantivity associated with the presence of more than one azo group in the dyestuff molecule.

A new class of dyestuffs has now been discoverd in which the members have more than one azo group and many of the properties of substantivity associated with the plurality of azo groups; however these new dyestuffs, in the main, do not have or have to an unusually low degree the disadvantage mentioned above.

According to the invention there are provided the metal complexes of the compounds of the formula:

$$\left[ A-N=N-\underset{\underset{OH}{\overset{OH}{\bigcirc\bigcirc}}}{\overset{}{\underset{HO_3S}{}}}-N=N-(M-N=N)_m-E \right] \left( \underset{R}{\overset{}{N-Z}} \right)_n$$
(1)
(2)

wherein

A stands for an aromatic radical,
M stands for a divalent radical of the naphthalene series containing a metallisable group in ortho position to the azo group marked (2),
m stands for 0 or 1,
E is the radical of a coupling component which, when m stands for 0, contains a hydroxyl group in ortho position to the azo group marked (2),
n stands for 1 or 2,
R stands for a hydrogen atom or an alkyl group having up to 6 carbon atoms, and
Z stands for an acyl radical which contains a reactive group, as hereinbefore defined.
When n-1, the $$-\underset{R}{\overset{}{N-Z}}$$

group may be attached to A or to E, and when n-2, there is one such group attached to each of A and E.

The metal present in the new compounds may be, for example, copper or nickel present in the ratio of one metal atom for each molecule of the compound of Formula 1 or, where the radical represented by A contains a hydroxyl or carboxylic acid group ortho to the azo group (1), there may be two atoms of copper or nickel for each molecule of the compound of Formula 1. Alternatively, the metal present may be chromium or cobalt present in the ratio of 0.5 or 1 atom for each molecule of the compound of Formula 1.

The aromatic radical represented by A in the above formula may be heterocyclic, carbocyclic or both heterocyclic and carbocyclic. As examples of radicals represented by A, there may be mentioned, for example monocyclic radicals such as phenyl which may be unsubstituted or may contain one or more substituents, such as chlorine, bromine, hydroxyl, sulpho, carboxy, methoxy, ethoxy, methyl, nitro, acetylamino and/or trifluoromethyl, A may alternatively represent a di- or tri-cyclic radical which can be free from azo groups, as in for example, radicals of the benzoylaminophenyl, diphenyl, stilbene, diphenylmethane, diphenyloxide, diphenylsulphide, diphenylamino, naphthyl and benzthiazylphenyl series, or which can be the radical of an azo compound, for example of the azobenzene, phenylazonaphthalene or benzene-azopyrazolone series. These radicals may also contain substituents of the types indicated above.

As examples of divalent radicals of the naphthalene series, represented by M in Formula 1 there may be mentioned, for example, 1-hydroxy-3-sulpho-2:6-naphthylene,
1-hydroxy-3-sulpho-2:7-naphthylene,
1-hydroxy-3,5-disulpho-2,6-naphthylene,
1-hydroxy-3,6-disulpho-2,7-naphthylene,
1-hydroxy-3-sulpho-6-carboxy-2,7-naphthalene,
1-hydroxy-3,6-disulpho-2,8-naphthylene and
1-hydroxy-3,5-disulpho-2,8-naphthylene.

The radical represented by E in Formula 1 may be that of any coupling component which couples in ortho position to a hydroxyl or enolised ketone group, for example, a phenol, a naphthol, an acetoacetarylide or a pyrazolone; where m stands for 1, E can alternatively stand for the radical of a coupling component of a different type, for example, a para-coupling amine of the benzene series or an ortho- or para-coupling amine of the naphthalene series.

As examples of alkyl radicals represented by R, there may be mentioned methyl, ethyl, n-butyl and n-hexyl.

As examples of acyl radicals which are represented by Z there may be mentioned for example, the radicals of $\alpha:\beta$-unsaturated aliphatic carboxylic acids such as acrylic acid, $\alpha$-chloro-acrylic acid, propiolic acid, maleic acid and mono- and di-chloromaleic acids; more particularly, Z may represent the radical of an acid which contains a labile halogen atom or a group which readily splits off to form an anion, for example the radical of a halogenated aliphatic acid such as chloroacetic acid, $\beta$-chloro and $\beta$-bromo-propionic acids and $\alpha,\beta$-dichloro propionic acid, or more especially, a heterocyclic radical which contains from 2 to 3 nitrogen atoms in the heterocyclic ring and at least one halogen atom or other labile substituent on a carbon atom.

As examples of such heterocyclic radicals, there may be mentioned, for example s-triazines and pyrimidines which contain bromine or, preferably, chlorine atoms, sulphonic acid groups, thiocyano groups, negatively substituted aryloxy and arylthio groups, such as sulphoneoxy, sulphophenylthio, nitorsulphophenoxy, disulphophenoxy and sulphonapthoxy groups; or which contain groups of the formula:

(2)

wherein Y represents the group of atoms necessary to form a 5-or 6-membered heterocyclic ring which may carry substituents or form part of a fused ring system; or which contain quaternary ammonium or pyridinium groups; or which contain groups of the formula:

(3)

wherein $R_3$ and $R_4$ may be the same or different and each represents a hydrogen atom or an alkyl, aryl or aralkyl group.

In the cases where the pyrimidine ring or triazine ring carries only one labile atom or group, the said ring may have one or more additional substituents on the remaining carbon atoms. As examples of such substituents, there may be mentioned, for example, cyano groups, amino and substituted amino groups such as methylamino, ethylamino, dimethylamino, β-hydroxy-ethylamino, di(β-hydroxyethyl)amino, cyclohexylamino, phenylamino, sulphophenylamino, N-methylsulphophenylamino, disulphophenylamino, sulphocarboxyphenylamino and carboxyphenylamino; alkoxy groups, preferably those containing from one to four carbon atoms; aryloxy groups, especially phenoxy, chlorophenoxy and methylphenoxy groups; and phenyl thio groups.

One preferred class of the new dyestuffs are the copper complexes of the disazo compounds Formula 1 in which $m$ stands for 0 and $n$ for 1, A represents a sulphophenyl radical carrying the

group, Z stands for a halogenated triazine radical especially the dihalogeno-s-triazine radical and E stands for a hydroxynaphthyl radical carrying from 1 to 2 sulphonic acid groups. These compounds are green and greenish blue reactive dyestuffs of high tinctorial strength.

A second class of especially valuable dyestuffs are the copper complexes of the trisazo compounds of Formula 1 in which A represents a benzene or naphthalene radical containing from 1 to 3 sulphonic acid groups, $m$ stands for 1, M represents the 1-hydroxy-3-sulpho-2,6-naphthylene or a 1-hydroxy-3,5-disulpho-2,6-naphthylene radical, E represents the radical of a 1-phenyl-5-pyrazolone having a methyl or carboxylic acid group in the 3-position of the pyrazole nucleus, $n$ stands for 1 and

stands for a halogeno-s-triazinylamino group, especially the dichloro-s-triazinylamino group, attached to the benzene ring in 1-position of the pyrazolone nucleus. These compounds are green reactive dyestuffs of high tinctorial strength and good light fastness and have the capacity to build up to give strong shades having excellent fastness to washing.

Yet a third class of valuable compounds are the copper complexes of the trisazo compounds of Formula 1 in which E represents the radical of a naphthol disulphonic acid, $m$ stands for 0, A represents the radical of a 1′-phenylpyrazol-5′-on-4′-ylazo-sulphobenzene radical carrying a methyl or carboxylic acid group on the 3-position of the pyrazole nucleus, $n$ stands for 1 and

represents a halogeno-s-triazinylamino group, especially the dichloro-s-triazine group, attached to the benzene ring in 1-position of the pyrazolone nucleus.

These compounds also are green reactive dyes of high tinctorial strength and good light fastness and have the capacity to build up to give strong shades having excellent fastness to washing.

As a further feature of the invention, there is provided a process for manufacture of the new azo compounds which comprises interacting the metal complex of a compound of Formula 1 wherein Z stands for a hydrogen atom, and the other symbols have the meanings stated above, with the acid halide or anhydride of an acid which contains a reactive group as hereinbefore defined.

The treatment of the metal complex with the acid halide or anhydride may conveniently be carried out by stirring an aqueous solution of the complex with an aqueous suspension or solution of the acid halide or anhydride; the temperature of the reaction may vary from 0° to 100° C. dependent on the ease with which water will react with the acid halide or anhydride group or the group capable of reacting with the fibre.

As examples of anhydrides or acid halides which may be used, there may be mentioned for example, the anhydrides or acid halides of α:β-unsaturated aliphatic acids such as chloromaleic anhydride, propiolyl chloride nd acrylyl chloride, the acid chlorides of halogenated aliphatic acids such as chloroacetyl chloride, sulpho-chloroacetyl chloride, β-bromo and β-chloro-propionyl chloride and α:β-dichloropropionyl chloride, and preferably, heterocyclic compounds which contain at least 2 nitrogen atoms in the heterocyclic rings and which contain 2 or more halogen, especially chlorine, atoms in the ortho positions to the nitrogen atoms, such as 2,4,6-tri-bromo and tri-chloro-pyrimidines, 2,4,5,6-tetrachloropyrimidine, 5 - methyl-2,4,6-trichloropyrimidine, 5-nitro-2,4,6-trichloropyrimidine, 2,4 - dichloro-5-nitro-6-methyl pyrimidine, 2,4 - dichloro - 5-nitropyrimidine, 2,4,6-trichloro-5-cyanopyrimidine, 5-carboethoxy-2,4-dichloropyrimidine, 5-carboxy-2,4-dichloropyrimidine, cyanuric bromide and, preferably, cyanuric chloride and the primary condensation products of cyanuric bromide or cyanuric chloride with ammonia or an organic mercaptan, hydroxy compound or an organic primary or secondary amine, for example methanol, ethanol, iso-propanol, phenol, o-, m- and p-chlorophenols o-, m- and p-cresols, o-, m- and p-sulphophenols, thiophenol, thioglycollic acid, potassium thiocyanate, mercaptobenzthiazole, methyl-, dimethyl-, ethyl-, diethyl-, n-propyl-, iso-propyl-, butyl-, hexyl- or cyclohexylamine, toluidine, piperidine, morpholine, methoxyethylamine, ethanolamine, aminoacetic acid, aniline-2:5-disulphonic acid, orthanilic, metanilic and sulphanilic acids, 2-, 3- and 4-aminobenzoic acids, 4- and 5- sulpho-2-aminobenzoic acids, 5-amino-2-hydroxybenzoic acid, 2-aminoethanesulphonic acid, aminonaphthalene mono- and disulphonic acids, N-methylaniline sulphonic acids and N-methylaminoethane sulphonic acid. The copper complexes used in the above process may be obtained by treatment of an azo compound of the formula:

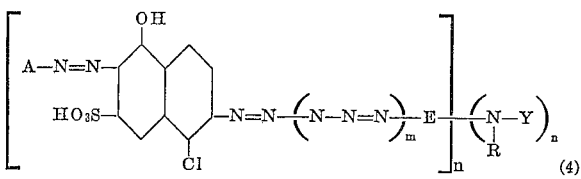
(4)

wherein A, M, E, R, $m$ and $n$ have the meanings stated above and Y stands for a hydrogen atom or an acetyl group, with a copper salt in a caustic alkaline medium as described in United Kingdom specification No. 388,332.

In the cases where $n$ stands for 2, it is frequently convenient to have one of the radicals represented by Y a hydrogen atom and the other an acetyl group. During the above treatment any acetyl radical in the

group is removed to give the desired $$-\underset{R}{\overset{}{N}H}$$

group.

The trisazo copper complex compounds used in the above process can alternatively be obtained by forming a disazo copper complex compound by the method indicated in the immediately preceding paragraph which has an unsubstituted amino group attached to one of the radicals represented by A and E and diazotising this compound and coupling the diazonium compound so obtained with a coupling component containing the desired $$-\underset{R}{\overset{}{N}-H}$$

group.

The other metal complexes used in the above process may be obtained by first forming a copper complex as indicated above followed by treatment with aqueous sodium sulphide whereupon the copper is removed, and treatment of the compound so obtained with a metal-yielding agent, such as nickel sulphate, cobalt chloride or chromium acetate.

The metal-free bisazo compounds of Formula 4 used for preparation of the copper complex compounds may themselves be obtained by diazotising an aromatic amine, coupling the diazonium compound with 1-chloro-2-amino-5-naphthol-7-sulphonic acid, diazotising the azo compound so obtained and coupling the diazonium compound with a coupling component which couples in ortho position to a hydroxyl or enolised ketone group. The final coupling component must contain an amino group of the formula $$-\underset{R}{\overset{}{N}-Y}$$

where R and Y have the meanings stated above, or the aromatic amine first diazotised must contain a group convertible to an amino group (for example an acetylamino or a nitro group).

Compounds of the type so obtained containing an unsubstituted amino group can be diazotised and coupled with a coupling component containing a —N—Y group to obtain the metal-free trisazo compounds of Formula 4.

As examples of aromatic amines which may be used, there may be mentioned, aniline,
orthanilic acid,
metanilic acid,
sulphanilic acid,
1-naphthylamine 4-, 5-, 6- and 7-sulphonic acids,
2-naphthylamine-6- or 8-sulphonic acid,
aminoazobenzene disulphonic acid,
2:5-dichloroaniline-4-sulphonic acid,
4-acetylamino-2-sulphonaniline,
5-acetylamio-2-sulphoaniline,
4-nitroaniline-2-sulphonic acid,
5-chloro-4-methylaniline-2-sulphonic acid,
4-methoxyaniline-2-sulphonic acid,
3-chloro-4-methylaniline-2-sulphonic acid,
4-chloroaniline-2-sulphonic acid,
4-chloroaniline-3-sulphonic acid,
4-chloro-3-methylaniline-6-sulphonic acid,
aniline-2:4-disulphonic acid,
aniline-2:5-disulphonic acid,
anthranilic acid,
5-sulphoanthranilic acid,
4-sulphoanthranilic acid,
5-nitroanthranilic acid,
4-nitro-anthranilic acid,
6-nitro-3-aminobenzoic acid,
4-acetylamino-2-aminobenzoic acid,
2-methoxy-1-naphthylamine-6-sulphonic acid,
2-ethoxy-1-naphthylamine-6-sulphonic acid,
2-naphthylamine 1:5-, 3:6-, 4:8-, 5:7- or 6:8-disulphonic acid,
2-naphthylamine-1-sulphonic acid,
4-sulpho-2-aminoanisole,
5-nitro-4-carboxy-2-aminoanisole,
4-nitro-2:5-dicarboxyaniline,
5-sulpho-2-methoxyaniline,
4-nitro-4'-aminostilbene-2,2'-disulphonic acid,
dehydrothioparatoluidine, and its sulphonic acid,
2-aminophenol,
2-aminophenol-4- and 5-sulphonic acids,
2-amino-4- and 5-nitrophenols,
2-amino-4-, 5- and 6-chlorophenols,
2-amino-3,4,6-trichlorophenol,
2-amino-4:6-dinitrophenol,
2-amino-4-chlorophenol-6-sulphonic acid,
2-amino-6-nitrophenol-4-sulphonic acid,
2-aminophenol-4:6-disulphonic acid,
2-amino-4-chloro-5-nitrophenol-6-sulphonic acid,
2-amino - 4 - nitrophenol-6-sulphonic acid and 6-nitro-4-methyl-2-aminophenol,
2-amino-5-naphthol-7-sulphonic acid,
2-amino-8-naphthol-6-sulphonic acid,
2-amino-5-naphthol-1:7-disulphonic acid,
2-amino-1-chloro-5-naphthol-7-sulphonic acid,
2-amino-8-naphthol-3,6-disulphonic acid and
2-amino-3-carboxy-8-naphthol-6-sulphonic acid.

As examples of coupling components which may be used, there may be mentioned, for example, phenol,
o-hydroxybenzoic acid,
acetoacetanilide,
acetoacet-o-anisidide,
4-sulphoacetoacetanilide,
5-sulphoaceto-acet-o-anisidide,
1-(4'-sulphophenyl)-3-methyl-5-pyrazolone,
1-(4'-sulphophenyl)-3-carboxy-5-pyrazolone,
1-(2':5'-dichloro-4'-sulphophenyl)-3-methyl-5-pyrazolone,
1-(2':5'dichloro-4'-sulphophenyl)-3-carboxy-5-pyrazolone,
1-(2'-chloro-4'-sulphenyl)-3-methyl-5-pyrazolone,
1-(2'-sulphophenyl)-3-methyl-5-pyrazolone,
1-phenyl-3-methyl-5-pyrazolone,
1-phenyl-3-carboxy-5-pyrazolone,
1-(2'-chlorophenyl)-3-methyl-5-pyrazolone,
1-(2'-carboxyphenyl)-3-methyl-5-pyrazolone,
1-(3'-carboxyphenyl)-3-methyl-5-pyrazolone,
1-(3'-chloro-6'-carboxyphenyl)-3-methyl-5-pyrazolone,
3-carboxy-5-pyrazolone,
1-(3'-aminophenyl)-3-methyl-5-pyrazolone,
1-(3'-aminophenyl)-5-pyrazolone-3-carboxylic acid,
1-(3'-amino-4'-sulphophenyl)-3-methyl-5-pyrazolone,
1-(3'-amino-4'-sulphophenyl)-5-pyrazolone-3-carboxylic acid,
1-(4'-amino-3'-sulphophenyl)-5-pyrazolone-3-carboxylic acid,
1-(4'-amino-3'-sulphophenyl)-3-methyl-5-pyrazolone,
1-(4'-amino-2'-sulphophenyl)-3-methyl-5-pyrazolone,
1(4'-amino-2'-sulphophenyl)-5-pyrazolone-3-carboxylic acid,
1-(2'-methyl-3'-amino-5'-sulphophenyl)-3-methyl-5-pyrazolone,
1-(2'-methyl-3'-amino-5'-sulphophenyl)-5-pyrazolone-3-carboxylic acid,
1-(4''-aminostilben-4'-yl)-3-methyl-5-pyrazolone-2',2''-disulphonic acid,
1-(4''-aminostilben-4'-yl)-3-carboxy-5-pyrazolone-2',2''-disulphonic acid,
1-naphthol,
2-naphthol,
5:8-dichloro-1-naphthol,
1-acetylamino-7-naphthol,
1-naphthol-5-sulphonic acid,
1-naphthol-4-sulphonic acid, 1-naphthol-3:6-disulphonic acid,
1-naphthol-3:8-disulphonic acid,
2-naphthol-7-sulphonic acid,
2-naphthol-6-sulphonic acid,
2-naphthol-8-sulphonic acid,
2-naphthol-3:6-disulphonic acid,
2-naphthol-6:8-disulphonic acid,
1-naphthol-3:6:8-trisulphonic acid,
1:8-dihydroxynaphthalene-3:6-disulphonic acid,
2-acetylamino-8-naphthol-6-sulphonic-acid,
2-benzoylamino-8-naphthol-6-sulphonic acid,
2-phenylamino-8-naphthol-6-sulphonic acid,
2-acetylamino-8-naphthol-3:6-disulphonic acid,
2-benzoylamino-8-naphthol-3:6-disulphonic acid,
2-phenylamino-8-naphthol-3:6-disulphonic acid,
2-acetylamino-5-naphthol-7-sulphonic acid,
2-benzoylamino-5-naphthol-7-sulphonic acid,
2-phenylamino-5-naphthol-7-sulphonic acid,
2-acetylamino-5-naphthol-1:7-disulphonic acid,
2-benzoylamino-5-naphthol-1:7-disulphonic acid,
1-acetylamino-8-naphthol-3:6-disulphonic acid,
1-benzoylamino-8-naphthol-3:6-disulphonic acid,
1-phenylamino-8-naphthol-3:6-disulphonic acid,
1-acetylamino-8-naphthol-4:6-disulphonic acid,
1-benzoylamino-8-naphthol-4:6-disulphonic acid,
1-phenylamino-8-naphthol-4:6-disulphonic acid,
1-acetylamino-8-naphthol-2:4-disulphonic acid,
1-benzoylamino-8-naphthol-2:4-disulphonic acid,
1-acetylamino-8-naphthol-4-sulphonic acid,
1-benzoylamino-8-naphthol-4-sulphonic acid,
1-amine-8-naphthol-3-sulphonic acid,
1-amino-8-naphthol-3:6- or 4:6-disulphonic acid,
2-amino-5-naphthol-7-sulphonic acid,
2-amino-5-naphthol-1:7-disulphonic acid,
1-amino-8-naphthol-4-sulphonic acid,
2-amino-8-naphthol-6-sulphonic acid,
2-amino-8-naphthol-3:6-disulphonic acid,
1-N-ethylamino-8-naphthol-3:6-disulphonic acid,
1-N-butylamino-8-naphthol-3:6-disulphonic acid,
2-N-methylamino-5-naphthol-7-sulphonic acid and
2-N-methylamino-8-naphthol-6-sulphonic acid.

If desired, the new azo dyestuffs which contain, as the reactive group, a heterocyclic ring containing only a single chlorine or bromine atom or one or two other labile groups, on the heterocyclic ring, may be obtained by taking one of the new azo dyestuffs containing two chlorine or bromine atoms attached to the heterocyclic ring and replacing one or both of these atoms by the appropriate group. This modified process forms a further feature of the invention. Thus, an amino or substituted amino group may be introduced by reaction with ammonia or a primary or secondary amine; an alkoxy or aryloxy (including negatively substituted aryloxy) group may be introduced by reaction with an alcohol, or aromatic hydroxyl compound; a sulphonic acid group may be introduced by reaction with an alkali metal sulphite; a thiocyano group may be introduced by reaction with potassium thiocyanate; a group of Formula 2 above may be introduced by reaction with the alkali metal salt of a mercaptoheterocyclic compound such as 2-mercaptobenzthiazole, 2 - mercaptobenzselenazole, 2 - mercaptobenziminazole, 2-mercaptobenzoxazole, 2-mercaptopyridine, 2-mercapto-6-methoxybenzthiazole, 2-mercapto-6-acetylaminobenzthiazole, 2- mercapto - 6 - sulphobenzthiazole; a quaternary group may be introduced by treatment with pyridine, or other tertiary amine; and a group of Formula 3 above may be introduced by reaction with a thioamide such as thio-acetamide and thioacetanilide.

The new metal-complex compounds have high tinctorial strength and are valuable for colouring wool, silk and polyamide fibres by application from an acid, neutral or weakly alkaline dyebath; they are especially valuable for use as "reactive" dyestuffs for cotton and other natural or regenerated cellulose materials. For colouring such materials the new metal complex azo compounds are preferably applied, either by dyeing or printing, to the materials in conjunction with a treatment with an acid-binding agent, for example sodium hydroxide, sodium carbonate or sodium bicarbonate, which may be applied to the cellulose textile material before, during or after the application of the compound. The resultant colourations are distinguished by their fastness to light and to washing.

The following examples illustrate but do not limit the invention. Parts are by weight.

EXAMPLE 1

Aniline-2:5-disulphonic acid is diazotised and coupled in alkaline medium with 1-chloro-2-amino-5-naphthol-7-sulphonic acid and the product obtained is diazotised and coupled in alkaline medium with 2-amino-5-naphthol-1:7-disulphonic acid. The disazo compound so obtained is boiled for about 1 hour in an aqueous solution containing 2% of sodium hydroxide, 2% of glycerol and 1.5 moles of copper sulphate.

10.2 parts of the pentasodium salt of the product obtained are dissolved in 200 parts of water and the solution is added to a suspension of 2.22 parts of cyanuric chloride in 27 parts of water and 50 parts of ice at such a rate that the temperature is maintained within the limits of 0–5° C. the pH of the mixture being raised to 6.5–7.0 by addition of sodium carbonate solution and maintained within these limits by continued addition of sodium carbonate solution until no further change in pH occurs.

4.7 parts of sodium diethyl metanilate and 0.3 part of sodium hydrogen sulphate are added, the dyestuff is precipitated by pouring the solution into acetone and is isolated by filtration. The filtercake is mixed with 1.88 parts of sodium diethylmetanilate and 0.12 part of sodium hydrogen sulphate and dried.

The product so obtained contains 2.0 atoms of chlorine for each molecule of dyestuff. It dyes cotton in green shades of good fastness to light and wet treatments when applied by known methods for reactive dyestuffs.

EXAMPLE 2

3-amino-acetanilide-4-sulphonic acid is diazotised and coupled with 1-chloro-2-amino-5-naphthol-7-sulphonic acid in alkaline medium and the product obtained is diazotised and coupled with 2-naphthol-6:8-disulphonic acid in alkaline medium. The acetylamino group is hydrolysed and the copper complex of the amino disazo compound is formed in a single step by coppering in the presence of glycerol and sodium hydroxide in analogous manner to Example 1.

9.19 parts of the tetra sodium salt of the product are dissolved in 200 parts of water and the solution is added to a suspension of 2.22 parts of cyanuric chloride in 25 parts of water and 50 parts of ice at such a rate that the temperature is maintained within the limits 0 and 5° C.

The mixture is stirred at a temperature of 0 to 5° C. the pH of the mixture being raised to 6.5–7.0 by addition of sodium carbonate solution and maintained within these limits by continued addition of sodium carbonate solution until no further change in pH occurs. A solution of 2.34 parts of the sodium salt of 3-aminobenzene-1-sulphonic acid in 50 parts of water is then added and the mixture is heated to 40–45° C. Sodium carbonate solution is added as required to maintain the pH of the solution at 7.0 until there is no further change in pH. The solution is then cooled, the dyestuff is precipitated by the addition of sodium chloride, isolated by filtration and the product dried in vacuo.

The product so obtained contains 0.95 atom of chlorine for each molecule of dyestuff. It dyes cotton in green shades of good fastness to light and wet fastness treatments when applied by known methods for reactive dyestuffs.

The following table summarises further examples of the invention obtained by a process similar to that described in Example 1. The amine named in the second column is diazotised and coupled with 1-chloro-2-amino-5-naphthol-7-sulphonic acid and the product obtained is diazotised and coupled with the coupling component named in the third column. The product obtained is converted to the copper complex, in some cases with simultaneous hydrolysis of the acetylamino group and condensed with the acylating agent named in the fourth column at a temperature which can be between 0 and 50° C. as necessary. The shade of material dyed with the compound so obtained is stated in the fifth column.

In the case of Examples 4, 5 and 6, 3 moles of copper sulphate are used to give the bis-copper complex.

column 4. The resulting monochlorotriazine compound dyes cellulosic fibres in the shade indicated in column 5.

EXAMPLE 48

3-aminoacetanilide-4-sulphonic acid is diazotised and coupled in alkaline medium with 1-chloro-2-amino-5-naphthol-7-sulphonic acid and the product obtained is diazotised and coupled in alkaline medium with 2-naphthol-6,8-disulphonic acid. The disazo compound so obtained is boiled for about 5 hours in an aqueous solution containing 4% sodium hydroxide, 4% of glycerol and 1.05 moles of copper sulphate.

91.85 parts of the copper complex aminodisazo com-

| Example | Disazo component | End component | Acylating agent | Shade |
|---|---|---|---|---|
| 3 | Aniline-2-sulphonic acid | 2-amino-5-naphthol-1,7-disulphonic acid. | Cyanuric chloride | Green. |
| 4 | 2-aminophenol-4-sulphonic acid | ——do—— | ——do—— | Greenish-blue. |
| 5 | 6-nitro-2-aminophenol-4-sulphonic acid. | ——do—— | ——do—— | Bluish-grey. |
| 6 | 2-amino-5-sulphobenzoic acid | ——do—— | ——do—— | Green. |
| 7 | 3-aminoacetanilide-4-sulphonic acid | 2-naphthol-6:8-disulphonic acid | ——do—— | Do. |
| 8 | ——do—— | 1-amino-8-naphthol-2,4-disulphonic acid. | ——do—— | Do. |
| 9 | 1-chloro-2-naphthylamine-5,7-disulphonic acid. | 2-amino-5-naphthol-1,7-disulphonic acid. | ——do—— | Greenish-blue. |
| 10 | 3-aminoacetanilide-4-carboxylic acid | 2-naphthol-6:8-disulphonic acid | ——do—— | Green. |
| 11 | 4-aminoacetanilide-3-sulphonic acid | 2-naphthol-6,8-disulphonic acid | ——do—— | Bluish-green. |
| 12 | ——do—— | ——do—— | 5-cyano-2,4,6-trichloropyrimidine | Do. |
| 13 | ——do—— | 1-naphthol-4-sulphonic acid | Cyanuric chloride | Do. |
| 14 | 3-aminoacetanilide-4-sulphonic acid | 2-amino-5-naphthol-1,7-disulphonic acid. | Acryloyl chloride (2 mols.) | Green. |
| 15 | ——do—— | ——do—— | Chloroacetyl chloride (2 mols.) | Do. |
| 16 | ——do—— | ——do—— | Cyanuric chloride (1 mol.) | Do. |
| 17 | ——do—— | Phenol-4-sulphonic acid | ——do—— | Bluish-green. |
| 18 | ——do—— | 2-naphthol-6-sulphonic acid | ——do—— | Greenish-blue. |
| 19 | Aniline-2-sulphonic acid | 2-amino-5-naphthol-7-sulphonic acid | ——do—— | Green. |
| 20 | 4-nitro-4'-aminostilbene-2,2'-disulphonic acid. | 2-amino-8-naphthol-3,6-disulphonic acid. | ——do—— | Do. |
| 21 | 2-naphthylamine-4,8-disulphonic acid. | 2-amino-5-naphthol-1,7-disulphonic acid. | ——do—— | Greenish-blue. |
| 22 | 3-aminoacetanilide-4-sulphonic acid | 2-naphthol-6,8-disulphonic acid | 2,4,6-trichloropyrimidine | Green. |
| 23 | ——do—— | ——do—— | 2,4,5,6-tetrachloro pyrimidine | Do. |
| 24 | ——do—— | ——do—— | 2-methoxy-4,6-dichloro-1,3,5-triazine | Bluish-green. |
| 25 | ——do—— | ——do—— | 2-phenoxy-4,6-dichloro-1,3,5-triazine | Do. |
| 26 | Aniline-2,4-disulphonic acid | 2-amino-5-naphthol-1,7-disulphonic acid. | Cyanuric chloride | Do. |
| 27 | Aniline-3,5-disulphonic acid | ——do—— | ——do—— | Do. |
| 28 | Aniline-4-sulphonic acid | ——do—— | ——do—— | Do. |
| 29 | Aniline-3-sulphonic acid | ——do—— | ——do—— | Do. |
| 30 | Aniline-2,5-disulphonic acid | 1-amino-8-naphthol-4-sulphonic acid. | ——do—— | Do. |
| 31 | ——do—— | 1-amino-8-naphthol-4,6-disulphonic acid. | ——do—— | Do. |
| 32 | Aniline-2-sulphonic acid | 2-methylamino-5-naphthol-7-sulphonic acid. | ——do—— | Greenish-blue. |
| 33 | 4-methoxyaniline-2-sulphonic acid | 2-amino-5-naphthol-1,7-disulphonic acid. | ——do—— | Bluish-green. |
| 34 | ——do—— | 2-methylamino-5-naphthol-7-sulphonic acid. | ——do—— | Greenish-blue. |
| 35 | 2,5-dimethoxyaniline-4-sulphonic acid. | 2-amino-5-naphthol-1,7-disulphonic acid. | ——do—— | Bluish-green. |
| 36 | 4-methylaniline-6-sulphonic acid | ——do—— | ——do—— | Do. |
| 37 | 2-chloro-4-methylaniline-5-sulphonic acid. | ——do—— | ——do—— | Do. |
| 38 | 2-naphthylamine-3,6,8-trisulphonic acid. | ——do—— | ——do—— | Green. |
| 39 | ——do—— | 1-amino-8-naphthol-4,6-disulphonic acid. | ——do—— | Do. |
| 40 | 3-aminoacetanilide-4-sulphonic acid | 2-naphthol-6,8-disulphonic acid | 2-thiocyanato-4,6-dichlorotriazine | Bluish-green. |
| 41 | Aniline-2,5-disulphonic acid | 2-(4'-amino-3'-sulphophenyl)-amino-8-naphthol-6-sulphonic acid. | Cyanuric chloride | Do. |

Examples 42–47 summarize further diazo dyestuffs of the invention obtained by a process similar to that depound so obtained are stirred with 2400 parts of warm water until dissolved and 6.9 parts of sodium nitrite are

| Example | Diazo component | Coupling component | Compound | Shade |
|---|---|---|---|---|
| 42 | 3-aminoacetanilide-4-sulphonic acid | 2-naphthol-6,8-disulphonic acid | 5-sulpho-2-aminobenzoic acid | Bluish-green. |
| 43 | ——do—— | ——do—— | Aniline-3,5-disulphonic acid | Do. |
| 44 | ——do—— | ——do—— | N-methylaniline-3-sulphonic acid | Do. |
| 45 | ——do—— | 2-amino-5-naphthol-1,7-disulphonic acid. | ——do—— | Do. |
| 46 | 4-aminoacetanilide-3-sulphonic acid | 2-naphthol-3,6-disulphonic acid | Metanilic acid | Do. |
| 47 | ——do—— | 1-naphthol-4-sulphonic acid | Aniline-3,5-disulphonic acid | Do. | scribed in Example 2. The compound shown in column 2 is diazotised and coupled with 1-chloro-2-amino-5-naphthol-7-sulphonic acid and the aminoazo compound so obtained is diazotised and coupled with the coupling component shown in column 3. The product is converted to the copper complex and condensed with 1 mole of cyanuric chloride and the 2,4-dichloro-triazinyl compound so obtained is then condensed with the compound shown in added. The solution is cooled to 10° C. and 48.6 parts of hydrochloric acid of specific gravity 1.18 are added. The mixture is stirred at 5–10° C. for 1 hour, then poured into a solution containing 31.1 parts of 2-(2'-methyl-3'-amino-5'-sulphophenyl)-3-methyl-5-pyrazolone and 85.3 parts of sodium carbonate in 800 parts of water at 0–5° C. The mixture is stirred for 1 hour, then the dyestuff is precipitated by addition of 680 parts of sodium chloride and the product is isolated by filtration and dried. 12.35 parts of the pentasodium salt of the copper complex aminotrisazo compound so obtained are dissolved in 500 parts of water and the solution is added during approximately 30 minutes to a well stirred suspension of 4.08 parts of cyanuric chloride in 25 parts of water and 50 parts of ice maintaining the temperature between the limits 0–5° C. The pH is maintained at 6.5–7.0 by adding sodium carbonate solution as required. After 3 hours 4.7 parts of sodium diethyl metanilate and 0.3 part of sodium hydrogen sulphate are added, the solution is filtered to remove the excess of cyanuric chloride and the dyestuff is precipitated by adding 150 parts of sodium chloride. The product is filtered off and the filtercake mixed intimately with 1.88 parts of sodium diethylmetanilate and 0.12 part of sodium hydrogen sulphate before drying in vacuo.

The product so obtained dyes leather and cellulosic fibres in yellowish-green shades of good fastness to wet treatments when applied by known methods for reactive dyestuffs.

The following table summarises further examples of the invention obtained in similar manner to the above example, i.e. by (1) coupling the diazonium compound of the amine named in the second column with 1-chloro-2-amino-5-naphthol-7-sulphonic acid, (2) diazotising the product obtained and coupling the diazonium compound with the coupling component named in the third column, (3) forming the copper complex of the product so obtained (with in some cases hydrolysis of the acetylamino group present), (4) diazotising the copper complex amino disazo compound so obtained and coupling the resultant diazonium compound with the coupling component named in the fourth column, (5) condensing the aminotrisazo compound so obtained with cyanuric chloride.

The shade of the resultant product is given in the fifth column.

lose textile materials in yellowish-green shades is obtained.

EXAMPLE 68

The trisazo copper complex dichlorotriazine dye obtained in Example 49 is further condensed with one mole of aniline-3,5-disulphonic acid in analogous manner to the process described in Example 2. A product which colours cellulose textile materials in yellowish-green shades is obtained.

EXAMPLE 69

The trisazo copper complex dichlorotriazine dye obtained in Example 52 is further condensed with 1 mole of aniline-3,5-disulphonic acid in analogous manner to the process described in Example 2. A product which colours cellulose textile materials in green shades is obtained.

EXAMPLE 70

The trisazo copper complex dye obtained in Example 55 is further condensed with 1 mole of metanilic acid in analogous manner to the process described in Example 2. A product which colours cellulose textile materials in green shades is obtained.

EXAMPLE 71

122.5 parts of the pentasodium salt of the dyestuff obtained in Example 2 are heated with 1600 parts of water at 80–85° C. and 320 parts of pyridine are added. The mixture is stirred at 80–85° C. for 30 minutes and the product poured into 3000 parts of acetone. The product obtained by filtration and drying is a black powder, which dyes cellulosic materials in green shades with good fastness to wet treatments and to light.

The following table summarises further examples of the invention containing a quaternary ammonium radical attached to the triazine nucleus. These are obtained by

| Example | Diazo component | 1st coupling component | 2nd coupling component | Shade |
|---|---|---|---|---|
| 49 | 3-aminoacetanilide-4-sulphonic acid | 2-naphthol-6,8-disulphonic acid | 1-(3'-aminophenyl)-5-pyrazolone-3-carboxylic acid | Green. |
| 50 | Aniline-2,5-disulphonic acid | 2,5-aminonaphthol-1,7-disulphonic acid | ____do____ | Do. |
| 51 | ____do____ | 1,8-aminonaphthol-2,4-disulphonic acid | 1-(2'-methyl-3'-amino-5'-sulphophenyl)-3-methyl-5-pyrazolone. | Olive green. |
| 52 | ____do____ | 2,5-aminonaphthol-7-sulphonic acid | ____do____ | Green. |
| 53 | ____do____ | 2,5-aminonaphthol-1,7-disulphonic acid | ____do____ | Do. |
| 54 | 2-naphthylamine-3,6,8-trisulphonic acid | ____do____ | ____do____ | Do. |
| 55 | Orthanilic acid | ____do____ | ____do____ | Do. |
| 56 | Aniline-2,5-disulphonic acid | ____do____ | 1-(3'-amino-4'-sulphophenyl)-3-methyl-5-pyrazolone. | Do. |
| 57 | ____do____ | ____do____ | 1-(3'-amino-4'-sulphophenyl)-5-pyrazolone-3-carboxylic acid. | Do. |
| 58 | ____do____ | 2,5-aminonaphthol-7-sulphonic acid | ____do____ | Do. |
| 59 | ____do____ | 2-amino-5-naphthol-1,7-disulphonic acid | 1-(2'-methyl-3'-amino-5'-sulphophenyl)-5-pyrazolone-3-carboxylic acid. | Do. |
| 60 | ____do____ | ____do____ | 1-amino-8-naphthol-3,6-disulphonic acid. | Blue. |
| 61 | ____do____ | ____do____ | 2-methylamino-5-naphthol-7-sulphonic acid. | Do. |
| 62 | ____do____ | ____do____ | 2-amino-8-naphthol-6-sulphonic acid | Blue-grey. |
| 63 | ____do____ | ____do____ | N-methyl-aniline | Green. |
| 64 | ____do____ | ____do____ | 2-amino-5-naphthol-1,7-disulphonic acid. | Grey. |
| 65 | ____do____ | ____do____ | 1-(3'-methylaminophenyl)-5-pyrazolone-3-carboxylic acid. | Green. |

EXAMPLE 66

The trisazo copper complex dichlorotriazine dye obtained in Example 53 is further condensed at 40° C. with 1 mole of aniline-3,5-disulphonic acid in analogous manner to the process described in Example 2. A product which colours cellulose textile materials in yellowish-green shades is obtained.

EXAMPLE 67

The trisazo copper complex dye obtained in Example 55 is further condensed with 1 mole of 2-amino-5-sulphobenzoic acid in analogous manner to the process described in Example 2. A product which colours cellulose textile materials in yellowish-green shades is obtained.

a process similar to that described in the above example by reacting the dyestuff obtained by the example named in column 2 with the tertiary amine named in column 3.

| Example | Dyestuff of Example | Tertiary amine | Shade |
|---|---|---|---|
| 72 | 43 | Pyridine | Bluish-green. |
| 73 | 66 | ____do____ | Green. |
| 74 | 45 | ____do____ | Bluish-green. |
| 75 | 69 | ____do____ | Green. |
| 76 | 70 | ____do____ | Do. |
| 77 | 43 | Trimethylamine | Bluish-green. |
| 78 | 43 | Nicotinic acid | Do. |
| 79 | 43 | 1,4-diaza-bicyclo-2,2,2-octane. | Do. |

EXAMPLE 80

12.25 parts of the pentasodium salt of the monochlorotriazine dyestuff described in Example 46 are stirred with 300 parts of water at pH 8.0. A solution of 1.98 parts of the sodium salt of mercaptobenzthiazole in 100 parts of water at pH 10.5 is then added and the mixture heated at 90–95° C. for 4 hours. On cooling the product separates from solution and is isolated by filtration and dried. The dyestuff obtained colours cotton in bluish-green shades with good fastness properties to wet treatments.

EXAMPLE 81

12.4 parts of the pentasodium salt of the monochlorotriazine dyestuff obtained in Example 45 are dissolved in 200 parts of cold water and the solution is added during 30 minutes to a stirred suspension of 2.77 parts of cyanuric chloride in 50 parts of water at 10–12° C. the pH being maintained at 6.0–6.5 by the simultaneous addition of sodium carbonate solution. After 2 hours 1.79 parts of disodium hydrogen phosphate and 3.21 parts of potassium dihydrogen phosphate are added. The mixture is then poured into 500 parts of acetone to precipitate the dyestuff and the product isolated by filtration. The filtercake is pasted intimately with 0.71 parts of disodium hydrogen phosphate and 1.29 parts of potassium dihydrogen phosphate. The compound so obtained contains 3.0 chlorine atoms per molecule and dyes cotton in green shades with good fastness to wet treatments when applied in presence of an acid-binding agent.

EXAMPLE 82

10.92 parts of the tetrasodium salt of the dichlorotriazinyl copper complex bisazo dyestuff obtained in Example 16 are stirred with 500 parts of water at 0–5° C. 0.69 parts of sodium nitrite are then added followed by 4 parts of hydrochloric acid solution of specific gravity 1.18. The mixture is stirred at 0–5° C. for 45 minutes. The pH of the mixture is then raised to 6.5 by adding 2 N sodium carbonate solution and the resulting mixture is added at a temperature of 0–5° C. to a solution of 3.61 parts of the disodium salt of 1-(3'-sulphophenyl)-5-pyrazolone-3-carboxylic acid in 200 parts of water at pH 7.5. The pH of the mixture is maintained at 6.9–7.0 by adding 2 N-sodium carbonate solution as required. The mixture is stirred at 0–5° C. for 1 hour, 9.4 g. of sodium diethylmetanilate and 0.6 g. of sodium hydrogen sulphate are then added and the product is precipitated from solution by adding 80 parts of sodium chloride. The product is isolated by filtration, mixed intimately with 1.88 parts of sodium diethylmetanilate and 0.02 parts of sodium hydrogen sulphate and dried. A darker green powder is obtained which dyes cotton in green shades of good fastness to wet treatments when applied by known methods for reactive dyestuffs.

Similar dyestuffs are obtained when the 1-(3'-hulphophenyl)-5-pyrazolone-3-carboxylic acid in Example 82 is replaced by any of the compounds listed in Table 5.

*Table 5*

| Example | Coupling component | Shade |
| --- | --- | --- |
| 83 | 1-(3'-sulphophenyl)-3-methyl-5-pyrazolone | Green. |
| 84 | 1-(2',5'-disulphophenyl)-3-methyl-5-pyrazolone. | Do. |
| 85 | 1-(2',5'-disulphophenyl)-5-pyrazolone-3-carboxylic acid. | Do. |
| 86 | 1-(6',8'-disulphonaphth-2'-yl)-5-pyrazolone-3-carboxylic acid. | Do. |
| 87 | 1-(5',7'-disulphonaphth-2'-yl)-5-pyrazolone-3-carboxylic acid. | Do. |
| 88 | 5-pyrazolone-3-carboxylic acid | Do. |
| 89 | 1-(2',5'-dichloro-4'-sulphophenyl)-3-methyl-5-pyrazolone. | Do. |
| 90 | 1-(4'-sulphophenyl)-5-pyrazolone-3-carboxylic acid. | Do. |

EXAMPLE 91

3-aminoacetanilide-4-sulphonic acid is diazotised and coupled with 1-chloro-2-amino-5-naphthol-7-sulphonic acid and the resulting aminoazo component diazotised and coupled with 1-amino-8-naphthol-2,4-disulphonic acid. The compound so obtained is converted to a copper complex by heating with an aqueous solution of copper sulphate, glycerol and sodium hydroxide. The product so obtained is demetallised by stirring at 20 to 25° C. for 18 hours with concentrated by hydrochloric acid and the metal-free dyestuff so obtained is converted to the 1:2-chromium complex by heating with 0.5 mole equivalents of chromium acetate in neutral aqueous solution at 95 to 100° C. for 10 hours.

89.6 parts of the tetrasodium salt of the chromium complex so obtained are dissolved in 3000 parts of water and the solution is added during 30 minutes to a stirred suspension of 20.3 parts of cyanuric chloride in 250 parts of ice and 50 parts of water keeping the temperature at 0–5° C. and maintaining the pH within the limits 6.0–6.5 by adding sodium carbonate solution as required. The mixture is stirred for 2½ hours at 0–5° C. 47 parts of sodium diethylmetanilate and 3 parts of sodium hydrogen sulphate are then added and the solution is poured into 6000 parts of acetone. The precipitated dyestuff is filtered off and the filtercake is mixed intimately with 18.8 parts of sodium diethylmetanilate and 1.2 parts of sodium hydrogen sulphate and dried in vacuo. The product dyes cotton in grey-green shades of good fastness to wet treatments when applied by known methods for reactive dyestuffs.

EXAMPLE 92

3-aminoacetanilide-4-sulphonic acid is diazotised and coupled in the known manner with 1-chloro-2-amino-5-naphthol-7-sulphonic acid and the resulting amino azo compound is diazotised and coupled with 2-hydroxynaphthalene-6,8-disulphonic acid. The compound so obtained is converted to a copper complex by heating with copper sulphate, glycerol and sodium hydroxide by the method described in Example 2. The compound so obtained is demetallised by stirirng with concentrated hydrochloric acid and filtering off the insoluble dyestuff which is then converted to the nickel complex by heating at 90 to 95° C. for 6 hours in a dilute aqueous acetic acid solution with 1 mole of nickel sulphate.

9.14 parts of the tetrasodium salt of the nickel complex so obtained are stirred with 280 parts of water. The solution is then added during 30 minutes to a stirred suspension of 2.03 parts of cyanuric chlorine in 35 parts of ice and 35 parts of water. The temperature is maintained at 0–5° C. during this addition by means of external cooling. When the addition is complete the pH of the solution is raised to 6.5 by adding 2 N sodium carbonate solution. The mixture is then stirred a further 2½ hours at a temperature of 0–5° C. and the pH then readjusted to 6.5. The solution is buffered by the addition of 6.62 parts of sodium diethylmetanilate and 0.423 part of sodium hydrogen sulphate. The dyestuff is precipitated by the addition of 105 parts of sodium chloride and is isolated by filtration. The filtercake is pasted with 1.88 parts of sodium diethylmetanilate and 0.12 part of sodium hydrogen sulphate and dried in vacuo.

The product dyes cotton in blue shades of good fastness to wet treatments when applied by known methods for reactive dyestuffs.

EXAMPLE 93

Aniline-2,5-disulphonic acid is diazotised and coupled with 1-chloro-2-amino-5-naphthol-7-sulphonic acid. The amino azo compound so obtained is diazotised and coupled with 2-amino-5-naphthol-1,7-disulphonic acid in alkaline medium and the resulting disazo compound is converted to a copper complex by boiling with copper sulphate, glycerol and sodium hydroxide in aqueous solution. The compound is decoppered by stirring for 18 hours at 20 to 25° C. with concentrated aqueous hydrochloric acid and the metal free dyestuff is converted to the 1:2-cobalt complex by heating with 0.5 mole equivalent of cobalt chloride in neutral aqueous solution at 95° C. for 18 hours. 18.75 parts of the pentasodium salt of the cobalt complex are dissolved in 330 parts of water and the solution is added to a stirred suspension of 3.87 parts of cyanuric chloride in 30 parts of water and 30 parts of ice. The temperature is maintained at 0–5° C. during the addition which is normally completed in approximately 30 minutes. The pH of the solution is raised to 6.5 by adding 2 N sodium carbonate solution and the mixture stirred for 2 hours at a temperature of 0–5° C. during which time the pH is kept at 6.5 by adding 2 N sodium carbonate solution as required. A solution of 4.1 parts of the sodium salt of metanilic acid in 50 parts of water is then added and the mixture is heated to 35–40° C. and stirred for 2 hours during which time the pH of the solution is maintained at 6.5–7.0 by adding 2 N sodium carbonate solution as required. The solution is allowed to cool and then poured into 1000 parts of acetone. The precipitated product is filtered off, washed with acetone and dried in vacuo.

The resulting bis-monochlorotriazinyl dyestuff dyes cotton in blue shades of good fastness to wet treatments when applied by known methods for reactive dyes.

EXAMPLE 94

2-aminophenol-4-sulphonic acid is diazotised and coupled with 1-chloro-2-amino-5-naphthol-7-sulphonic acid in alkaline medium. The resulting monoazo compound is diazotised and coupled with 2-amino-5-naphthol-1,7-disulphonic acid in alkaline medium. The disazo compound so obtained is heated with 2.1 molecular proportions of copper sulphate in an aqueous medium containing 4% of sodium hydroxide and 4% of glycerol. The product contains two atoms of copper in combination with each molecule of dyestuff.

9.96 parts of the copper complex so obtained is dissolved by stirring with 400 parts of water and the solution is cooled to 0–5° C. 0.76 parts of sodium nitrite is added followed by 3.39 parts of hydrochloric acid of S.G.1.18. The mixture is stirred at 0–5° C. for 1 hour, 1.25 parts of urea is then added and stirring continued for ½ hour. Sodium carbonate solution is then added until the pH of the mixture is 6.5. The mixture is then added to a neutral solution of 1-(2'-methyl-3'-(4'',6''-dichlorotriazin - 2''-ylamino)-5'-sulphophenyl)-3-methyl-5-pyrazolone obtained in the following manner:

3.11 parts of 1-(2'-methyl-3'-amino-5'-sulphophenyl)-3-methyl-5-pyrazolone are stirred with 100 parts of water and sodium carbonate solution is added to bring the pH of the solution to 7.0. The solution so obtained is then added during 30 minutes to a stirred suspension of 2.03 parts of cyanuric chloride in 15 parts of water and 25 parts of ice. The temperature during the addition is maintained within the limits 0–5° C. and this temperature is maintained for a further 1 hour. The pH of the solution is raised to 7.0 by adding sodium carbonate solution.

After the addition of the prepared suspension of the diazo compound to the above solution the pH of the mixture is adjusted to 6.9–7.0 by addition of sodium carbonate solution and the mixture is kept at a temperature of 0–5° C. for at least 1 hour. 4.7 parts of sodium diethylmetanilate and 0.3 parts of sodium hydrogen sulphate is then added and the product isolated by addition of 60 parts of sodium chloride. The precipitated dyestuff is filtered off and the filtercake is mixed intimately with 1.88 parts of sodium diethylmetanilate and 0.02 part of sodium hydrogen sulphate before drying in vacuo.

The product so obtained dyes cotton in green shades of good fastness to wet treatments when applied by known methods for reactive dyestuffs.

What we claim is:

1. A copper complex compound having from 1 to 2 copper atoms in complex union with a compound of the formula:

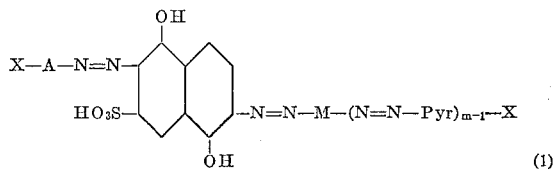

wherein
A stands for a radical selected from the class consisting of sulphophenylene radicals in which any further substituents are selected from hydroxyl, nitro, carboxy, methoxy, methyl, chloro, and sulpho, and sulphonaphthylene radicals in which any further substituents are selected from chlorine and sulpho,
M stands for a sulpho-monohydroxynaphthylene radical in which the hydroxy group is ortho to the azo group linking M to the dihydroxysulphonaphthylene radical,
$m$ stands for an integer of at most 2,
Pyr is the radical of a pyrazolone coupling component, and one X stands for a group of the formula:

and the other X stands for a member of the class consisting of hydrogen and a group of Formula 2 wherein R stands for a member of the group consisting of hydrogen and alkyl groups having up to 6 carbon atoms and Z represents a radical selected from the group consisting of acryloyl, chloroacetyl, dichloro-s-triazine, cyano-dichloropyrimidine, dichloropyrmidine, trichloropyrimidine, methoxy chlorotriazine, phenoxy chlorotriazine and thiocyanatochlorotriazine radicals.

2. A copper complex compound according to claim 1, having the formula:

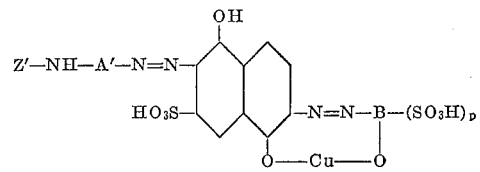

wherein
Z' stands for dichloro-s-triazine radical,
A stands for a sulphophenyl radical,
B is a 1:2-naphthylene radical, and
$p$ stands for one of the numbers 1 and 2.

3. A copper complex compound according to claim 1 having the formula:

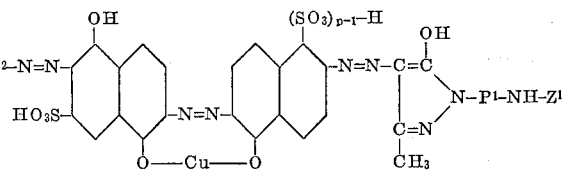

where
$A^2$ is a sulphoarylene radical of the formula:

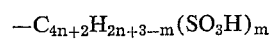

wherein $n$ is an integer less than 3,
$m$ is an integer less than 4,
$p$ is an integer less than 3,
$P^1$ is a benzene radical, and
$Z^1$ is dichloro-s-triazine radical.

4. Complexes according to claim 1 having the formula:

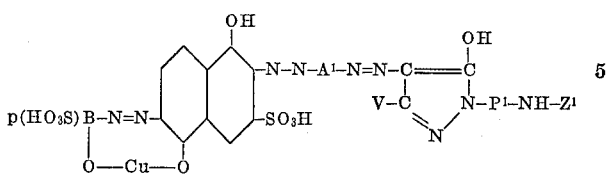

wherein
$A^1$ stands for a sulphophenyl radical,
B is a 1:2-naphthylene radical,
V stands for a methyl or carboxylic acid group,
$P^1$ stands for a benzene nucleus,
$Z^1$ for dichloro-s-triazine radical, and
$p$ stands for one of the numbers 1 and 2.

References Cited by the Examiner

UNITED STATES PATENTS

| | | | |
|---|---|---|---|
| 2,891,047 | 6/59 | Suckfull et al. | 260—148 |
| 3,036,058 | 5/62 | Andrew et al. | 260—146 |
| 3,038,893 | 6/62 | Andrew | 260—146 |

CHARLES B. PARKER, *Primary Examiner.*